R. D. JONES.
REVERSIBLE COUNTER SHAFT GEARING.
APPLICATION FILED JULY 2, 1913.
1,152,735.
Patented Sept. 7, 1915.
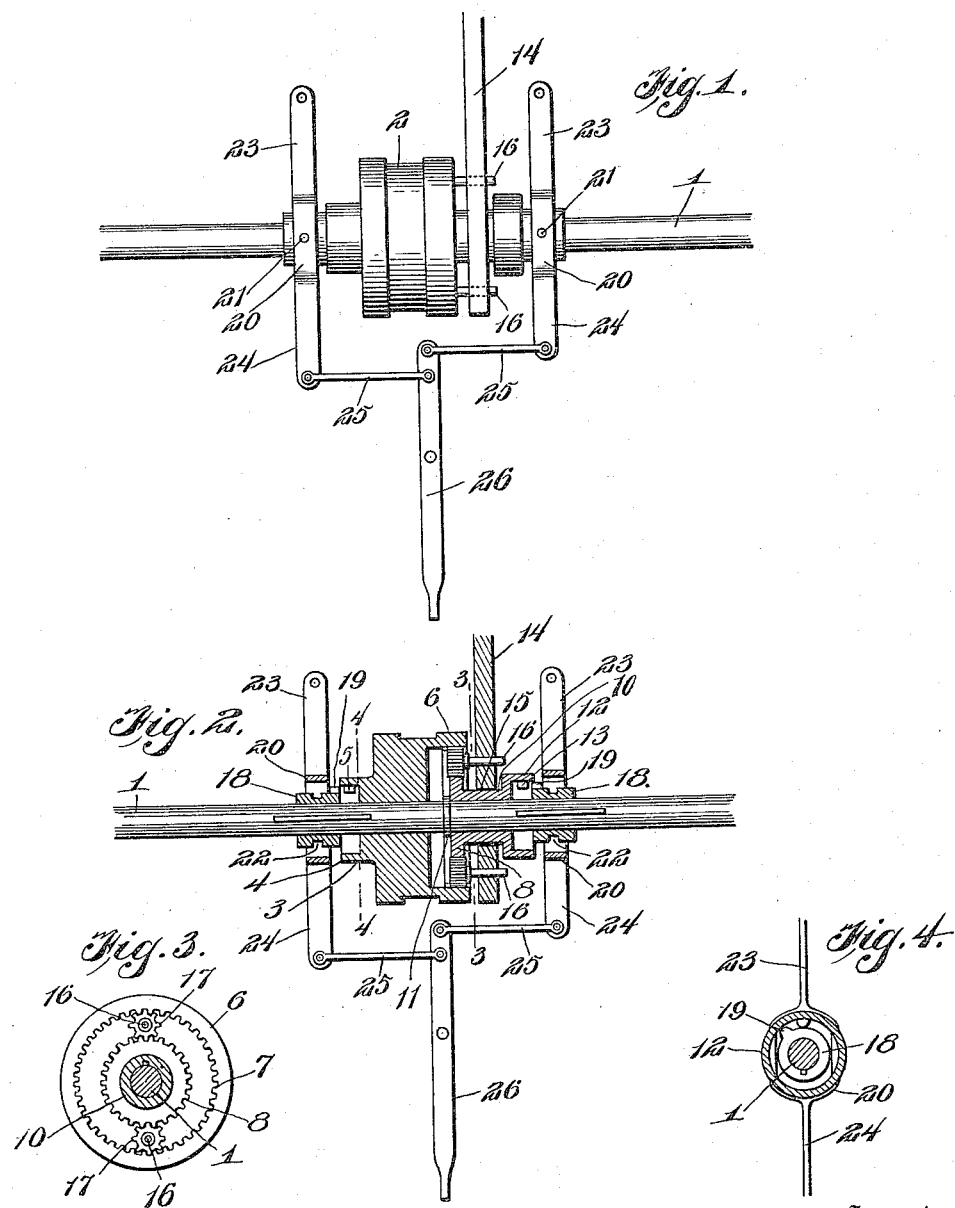
Inventor
Roy D. Jones
Witnesses
Louis R. Heinrichs
D. W. Gould
By Victor J. Evans
Attorney

UNITED STATES PATENT OFFICE.

ROY D. JONES, OF CUYAHOGA FALLS, OHIO.

REVERSIBLE COUNTER-SHAFT GEARING.

1,152,735.  Specification of Letters Patent.  Patented Sept. 7, 1915.

Application filed July 2, 1913. Serial No. 777,109.

*To all whom it may concern:*

Be it known that I, ROY D. JONES, a citizen of the United States, residing at Cuyahoga Falls, in the county of Summit and State of Ohio, have invented new and useful Improvements in Reversible Counter-Shaft Gearing, of which the following is a specification.

The invention relates to reversing mechanism designed particularly for use in connection with counter-shaft pulleys to avoid the use of the usual additional pulley belt and by such avoidance reduce the weight upon the line shaft.

The main object of the present invention is the provision of a reversing mechanism for a counter shaft, the reversing mechanism as a whole being controlled through a single lever whereby the driving pulley may be driven by the counter-shaft in either direction at the will of the operator.

The invention in its preferred form of details will be described in the following specification, reference being had particularly to the accompanying drawings, in which:—

Figure 1 is a perspective view illustrating the improvement. Fig. 2 is a vertical central section of the same. Fig. 3 is a vertical section on line 3—3 of Fig. 2. Fig. 4 is a vertical section on line 4—4 of Fig. 2.

Referring particularly to the accompanying drawings, 1 represents a counter-shaft on which is loosely mounted a pulley 2. The pulley constitutes the driving pulley, designed to operate a particular machine from the counter-shaft through the medium of the usual belt connection. On one face the pulley is provided with a hub 3, the free end of which is hollowed to present an annular flange 4 interiorly formed with a projection 5. The opposite face of the pulley is centrally cut away to form an annular flange 6 which on its inner surface adjacent the outer edge is provided with an annular series of gear teeth 7. A gear 8 is loosely mounted on the counter-shaft through the medium of an elongated hub 10, said counter-shaft having a stop 11 to limit movement of the hub and position the gear 8 in radial alinement with the gear teeth 7. The free or outer end of the hub 10 is formed to provide an annular flange 12 having an inwardly extending projection 13 corresponding in this respect to the formation of the outer end of the hub 3 of the pulley. A plate 14 is connected to the frame which supports the counter-shaft and is formed with an opening 15 to loosely receive the hub 10. In the plate are rotatably mounted in diametric relation to and beyond the hub 10 stud shafts 16 carrying pinions 17 on their inner ends, the pinion forming the intermeshing element between the gear teeth 7 and the gear 8. The clutch elements duplicated adjacent the hubs 3 and 10 comprise cylindrical bodies 18 formed at one end with a radial lug 19 of a size to seat in the recess adjoining the projection 5 or 13 of the hub 3 or hub 10 respectively. The bodies 18 which constitute the movable elements of the clutch members are keyed or splined on the counter-shaft for independent longitudinal movement thereon, but are otherwise fixed with relation to the shaft. Straps 20 encircle the respective bodies having diametrically opposed lugs 21 to seat in the annular channels 22 in the bodies whereby the bodies may be moved longitudinally of the counter-shaft but are capable of free rotation with respect to the straps. The straps are supported by projecting members 23 pivotally connected to a suitable fixture and are operated by opposingly projected members 24 connected by links 25 to the reversing lever 26.

From the above construction it will be obvious that the counter-shaft may be driven in either direction by the pulley and the direction of movement of the counter-shaft will be controlled by the relative disposition of the clutch members. For example, if the lever 26 has been moved in one direction the body 18 next the hub 3 will be forced toward the hub and the lug 19 of the body caused to engage with the projection 5 of the hub locking the pulley to the counter-shaft through this clutch connection. The counter-shaft then will be driven in the same direction as the pulley, this particular movement of the lever serving to withdraw the body next the hub 10 from said hub. If the lever is moved in the reverse direction the lug 19 on the body 18 adjacent the hub 10 will engage the projection 13 in said hub and connect the gear 8 for direct and similar rotation with the counter-shaft. The pulley 2 however, is driven from the gear 8 through the intermediate pinions 17 with the result that the travel of the pulley will be the reverse of that of the counter-shaft. The manually controlled clutch elements are so arranged that with the lever 26 in an intermediate or neutral position the pulley will be free of connection with the counter-shaft.

It is of course to be understood that the various parts are to be constructed in such size and of such material as to resist wear and to avoid breakage under the limited strain to which the pulley may be put by a load upon the particular machine operated, and I therefore contemplate the construction of the gears and pinions and rack in any approved type which will permit ready interfitting and comparatively noiseless cooperation of the teeth without sacrificing the necessary strength of such members.

What is claimed is:—

A reversing gearing for a counter shaft including a shaft, a relatively fixed element encircling the shaft and having a bore of materially greater diameter than that of the shaft, a pulley rotatably mounted on the shaft, a hub loosely mounted on the shaft and having an annular projection formed with gear teeth and seated in a recess in the pulley, said annular projection being of materially less diameter than the interior diameter of the recess, said hub being rotatably mounted in the bore of the fixed element, pinions engaging the gear teeth of the annular projection and a gear rack formed on the interior of the recess, said pinions being diametrically located with respect to the pulley and rotatably mounted in the fixed element, and means for operatively connecting either the pulley or the hub to the shaft.

In testimony whereof I affix my signature in presence of two witnesses.

ROY D. JONES.

Witnesses:
  EMILY FELMLY,
  JOHN CORBETT.

Copies of this patent may be obtained for five cents each, by addressing the "Commissioner of Patents, Washington, D. C."